Nov. 7, 1933.  L. E. GROVE  1,934,497
TIRE RECORD DEVICE
Filed May 16, 1932
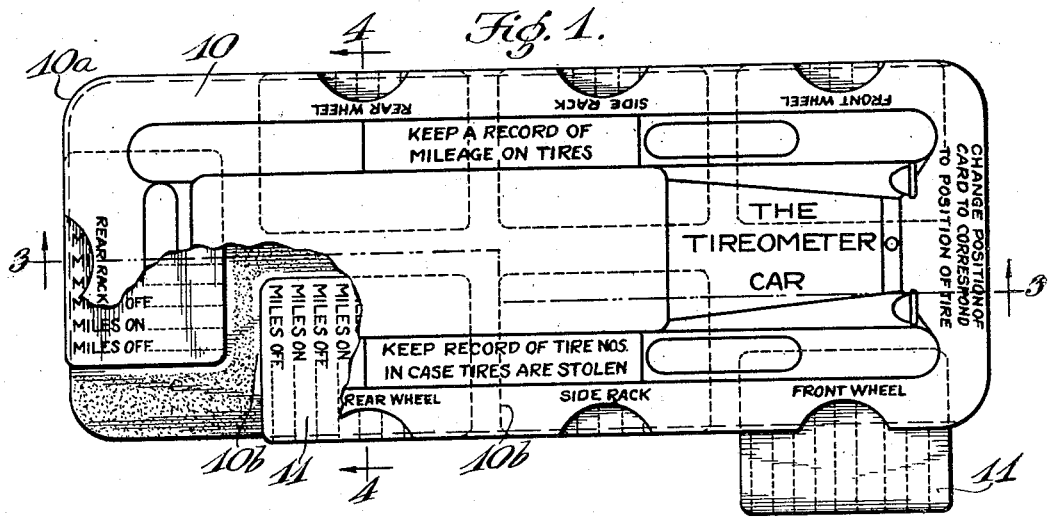
Fig. 1.
Fig. 2.
Fig. 3.
Fig. 5.
Fig. 4.
Inventor:
Leo E. Grove
By Milo B. Stevens & Co.
Attorneys.

Patented Nov. 7, 1933

1,934,497

UNITED STATES PATENT OFFICE 1,934,497

TIRE RECORD DEVICE

Leo E. Grove, Hinsdale, Ill.

Application May 16, 1932. Serial No. 611,503

2 Claims. (Cl. 40—64)

My invention pertains to automobile tires, and more particularly to the matter of keeping a record thereof for purposes of identification, extent of use and location in which used, and my main object is to provide a device which may be handily carried by the automobile owner or driver to serve as a record for the purposes specified.

A further object of the invention is to provide the novel device with means for recording identifying and mileage data for every tire on the car.

A still further object of the invention is to provide the novel device with units corresponding to the tires carried by the car and located in positions corresponding thereto.

Another object of the invention is to design the novel device in the form of a flat object bearing a plan view of the car and having the tire representing units arranged in conformity with the tires indicated in the illustration.

An additional object of the invention is to lend the same a form suitable for advertising purposes.

With the above objects in view and any others that may suggest themselves from the specification and claims to follow, a better understanding of the invention may be had by reference to the accompanying drawing in which—

Fig. 1 is a plan view of the device;

Fig. 2 is an edge view thereof;

Fig. 3 is a longitudinal section, taken on the line 3—3 of Fig. 1;

Fig. 4 is a cross section taken on the line 4—4 of Fig. 1; and

Fig. 5 is an enlarged plan view of one of the tire representing units.

It is customary for owners of automobiles to keep a check on the mileage and condition of their tires, in order that they may give them the proper attention and be in a position to report the mileage of any tire when seeking an adjustment. However, mileage is generally taken at random from the speedometer reading of the car mileage, or is recorded in an offhand or careless manner, so that frequently the record is lost or incomplete, resulting in an uncertainty and difficulty when a check on the tires is made. I have, therefore, provided the new record device which is easy to handle and use, and which encourages the keeping of tire records.

In carrying out the invention, I construct the novel tire record device in the form of two major parts, comprising a holder 10 and a set of tire representing units 11. The holder is composed of two elongated sheets of paper, celluloid or the like, these being firmly pasted, fastened or molded together and preferably made with rounded corners 10a. At certain points, the contiguous faces of the sheets are devoid of adhesive, being designed to provide pockets 10b accessible from the sides and rear of the holder 10. As indicated in Fig. 1, these pockets are rectangular and are designed to receive the rectangular cards 11. The sheets 10 are cut out as indicated at 10c at the front of each pocket in order that a portion of the card 11 may be sufficiently exposed for withdrawal or removal by the use of the thumb and forefinger. Also, the lower sheet 10 is somewhat smaller than the upper one along the edges where the pockets are located in order that cards may be inserted into selected pockets without the difficulty of splitting the sheets apart, which would be the case if the edges ended evenly. Thus, to insert a card, it is merely necessary to tuck it under the holder with a tendency to lift the overying portion of the upper sheet, this causing the pocket to open readily. The pockets are dimensioned with sufficient width to permit the easy insertion of the cards 11, yet the walls of the pockets will by this action be placed under such tension as to firmly engage the cards and prevent them from receding or falling out when the device is handled, carried in the coat or car pocket, or transferred from one place to another.

It will be noted that the pockets are three on each side and one at the rear of the holder. On the upper face of the latter is imprinted or otherwise illustrated, a plan view of a typical automobile, as indicated in Fig. 3, data such as "front wheel, side rack, rear wheel, and rear rack" being placed at points approximately corresponding with the locations of the front tire, side spares, rear tires, and the rear spare. The illustration of the automobile is helpful to impart a quick visual idea of the relation of the particular pockets with the correspondingly located tires, so that the reading data just referred to is purely to supplement the illustration. The illustration of the automobile hood is preferably chosen for the indication of a representative legend for the tire record device; and that portion of the illustration which represents the top of the car body has been left blank but may carry suitable advertising matter, such as that of a tire company or a concern dealing with some automobile accessory or product. I have indicated in addition three cautionary remarks for the user of the device, pointing to the recording of tire mileage and numbers.

Fig. 5 shows more clearly the data carried by the cards 11. It is seen that the make of the tire is first called for, then the serial number, and then the purchasing date. After this data, the card calls for a series of speedometer readings representing the mileage noted when a tire is put on a certain wheel or spare rack and the mileage when it is taken off. Thus, assuming that the car has just been purchased new, the owner takes one card out, such as that for the right front tire and copies the make and serial number from the tire, noting the purchasing date. Then he notes the mileage reading of the speedometer and inscribes it after the first legend "miles on". He then repeats the process with respect to the right spare tire, then the right rear tire, then the rear spare, if one is carried, and so on around. Now, the tire record device may be laid away, or carried in the coat or car pocket. In the event that a puncture is suffered by one of the tires, such as the front left, the change usually made is by putting the defective tire on one of the spare racks, while the good tire on such rack is put on the left front wheel. As this is done, the speedometer reading is entered on the respective cards, and these cards are exchanged relative to the pockets as the tires have been to occupy the correspondingly located pockets. Thus, not only does this process record the mileage the left front tire has run until the time of the puncture, but the mileage of the newly mounted tire is to make is also prepared for; and further, the new locations of the cards give evidence at all times where the tires have been transferred, so that any hard or uneven wear of a tire may be traced to its position by means of the record device.

It will be seen that, as the car continues in use, changes in the positions of the tires and the mounting of new tires may all be entered in the record cards, so that the owner or driver will be able to tell at any time the number of tires the car has required during years of use and the incidents relative thereto, such as periods of usefulness or freedom from damage, mileage accomplished by one make of tire or another, and the effect of different positions on the wear of the tires. This check-up is, of course, valuable when tires require repairs or adjustment, and is useful as a guide to the efficiency or deficiency of one brand of tire or another, teaching the owner or driver that a tire record is conducive to the economical purchase and maintenance of tires. Further, the thoroughness with which the identity of the tires is recorded in the present device would be helpful in case any tires are stolen, aiding in the identification thereof if found.

It will be seen that the novel tire record device is also an article of extreme simplicity, of a form to readily fit any pocket—the drawing shows it in full size—and of a nature to teach the owner or driver the habit of keeping a careful check on the tires of his car. It is of special advantage to firms keeping fleets of trucks, where tire economy is usually figured on a scientific basis. Finally, the simplicity and large surface area of the device for printing or illustrative matter fits it particularly for advertising, the handy and frequent use of the device bringing the advertised product to the intimate attention of the car owner or driver.

I claim:—

1. A record device comprising a pair of superposed, rectangularly shaped flat members designed to represent a vehicle in plan, said members being united in certain areas and separated at other areas, the separated portions opening at the edges of the members to form pockets, the pockets being placed at those positions which would normally correspond to the location of the front and rear wheels of the vehicle, as well as the location of the spare tires, and record receiving cards interchangeably insertible in the pockets.

2. A record device comprising a pair of superposed, rectangularly shaped flat members designed to simulate a vehicle in plan, the lower of the members being of less area than the upper one, the members being united in certain areas and separated at other areas to form pockets at its side edges and at one end, the pockets being located at those positions which would normally correspond to the location of the front and rear wheels of the vehicle, as well as the location of spare tires, and record receiving cards interchangeably insertible in the pockets.

LEO E. GROVE.